United States Patent
Du et al.

[11] Patent Number: 5,898,532
[45] Date of Patent: Apr. 27, 1999

[54] MR HEAD THERMAL ASPERITY RECOVERY

[75] Inventors: Ke Du; Deanne S. Grover, both of Oklahoma City; Jim R. Shaver; Dennis C. Kastl, both of Yukon, all of Okla.

[73] Assignee: Seagate Technology Inc., Scotts Valley, Calif.

[21] Appl. No.: 08/724,358

[22] Filed: Oct. 1, 1996

Related U.S. Application Data

[60] Provisional application No. 60/021,038, Jul. 2, 1996.
[51] Int. Cl.$^6$ ........................................... G11B 5/09
[52] U.S. Cl. ........................... 360/46; 360/55; 360/65; 360/8; 360/48; 360/67
[58] Field of Search .................... 360/55, 46, 65, 360/53, 8, 48, 67; 369/58

[56] References Cited

U.S. PATENT DOCUMENTS

| | | | |
|---|---|---|---|
| 4,816,743 | 3/1989 | Harms et al. | 324/56 |
| 4,881,136 | 11/1989 | Shiraishi et al. | 360/25 |
| 4,914,398 | 4/1990 | Jove et al. | 360/46 X |
| 4,942,609 | 7/1990 | Meyer | 360/25 |
| 5,270,882 | 12/1993 | Jove et al. | 360/67 |
| 5,367,409 | 11/1994 | Ottesen et al. | 360/32 |
| 5,410,439 | 4/1995 | Ebgert et al. | 360/75 |
| 5,424,638 | 6/1995 | Huber | 324/212 |
| 5,455,730 | 10/1995 | Dovek et al. | 360/113 |
| 5,587,848 | 12/1996 | Shimotashiro | 360/46 |
| 5,654,943 | 8/1997 | Ohmori | 369/13 |

*Primary Examiner*—Aristotelis M. Psitos
*Assistant Examiner*—Alan Faber
*Attorney, Agent, or Firm*—Westman, Champlin & Kelly, P.A.

[57] ABSTRACT

A disc drive data recovery system for recovering data from a magnetic disc having asperities is disclosed. The data recovery system includes a magnetoresistive head for reading magnetically encoded data from the magnetic disc and providing in response a signal indicative of the magnetically encoded data. Contact between the magnetoresistive head and an asperity corrupts the signal such that the signal contains thermal asperity noise. The data recovery system includes an asperity recovery filter coupled to the magnetoresistive head for receiving the signal from the magnetoresistive head and reducing the thermal asperity noise in the signal.

13 Claims, 5 Drawing Sheets

MR HEAD THERMAL ASPERITY RECOVERY

BACKGROUND OF THE INVENTION

The present invention claims the benefit of earlier filed U.S. Provisional Application No. 60/021,038, entitled MR HEAD THERMAL ASPERITY RECOVERY filed on Jul. 2, 1996.

The present invention relates to disc drive data storage and recovery systems. More particularly, the present invention relates to a disc drive data recovery system for recovering data from a surface of a magnetic disc having asperities.

In disc drives having magnetoresistive (MR) heads, the slider which carries the MR head flies over a surface of a magnetic disc having data stored in a magnetically encoded format. The MR head provides a read signal, indicative of the data read from the disc, to a preamplifier circuit. After amplification by the preamplifier, the read signal is filtered prior to being received by the read channel of the disc drive.

Defects above the surface of the disc, known as asperities, result in undesirable head-to-disc interaction as the head slider flies over the surface defect on the disc. Immediately after contact with an asperity, the heat (i.e., a thermal asperity) generated by the contact changes the resistive properties of the MR head. As a result, the corresponding signal read by the MR head is distorted by a voltage spike and subsequent decay, sometimes causing the data stored near the thermal asperity to unrecoverable. In most cases, a thermal asperity lasts for one to two microseconds, which represents a data error generally beyond the preferred maximum error correction length of the typical error correction code (ECC) used by the disc drive. For example, a one-microsecond thermal asperity which occurs on a track written at 128 Mbits per second will corrupt 16 bytes of data. If the ECC capability is less than 16 bytes, the thermal asperity will cause the entire sector of data to be unrecoverable.

The number of thermal asperities existing on a single disc drive is typically found to be small in comparison to other types of media defects. Therefore, asperities which are located in the factory during the defect scanning process are recorded in the drive's primary defect list, and the drive does not store data at those locations. However, some asperities go undetected during the factory defect scanning process and only become problematic after the disc drive is operating in the field. For these undetected and other "growth" asperity defects, a method of recovery is needed which will significantly increase the chances of recovering data recorded over the asperity. After the data has been recovered, the disc drive or host operating system could then use normal relocation procedures to move the data to a safer disc location.

SUMMARY OF THE INVENTION

The present invention includes a disc drive data recovery method and system for recovering data from a magnetic disc having asperities on its surface. The system and method of the present invention utilize the frequency differences between the thermal asperity noise and the read back signal to reduce the thermal asperity noise such that data stored at the location of the asperity can be recovered and subsequently moved to a different location on the magnetic disc. A dynamic filter is used to reduce the thermal asperity energy to limit the duration of the corrupted read signal to within the ECC correction span of the drive, so that the recorded data can be recovered with the ECC applied. The bandwidth of the filter is dynamically changed during thermal asperity recovery.

A disc drive data recovery system for recovering data from a magnetic disc having asperities is disclosed. The data recovery system includes a magnetoresistive head for reading magnetically encoded data from the magnetic disc and providing in response a signal indicative of the magnetically encoded data. Contact between the magnetoresistive head and an asperity causes a thermal asperity which corrupts the signal such that the signal contains thermal asperity noise. The data recovery system includes a thermal asperity recovery filter coupled to the magnetoresistive head for receiving the signal from the magnetoresistive head and reducing the thermal asperity noise in the signal.

DETAILED DESCRIPTION OF THE PREFERRED EMBODIMENTS

Figure 1:
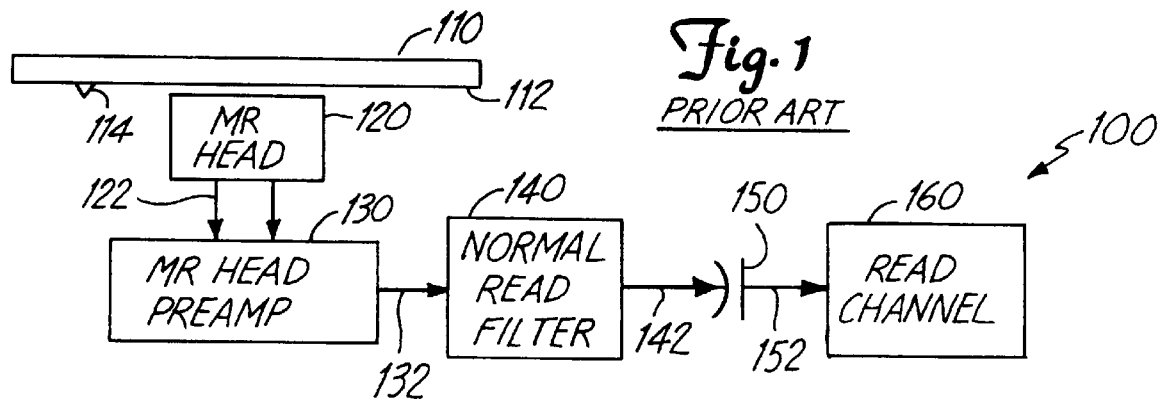
FIG. 1 is a block diagram of a prior art disc drive data recovery system for reading data from a surface of a magnetic disc.

FIG. 1 is a block diagram of prior art disc drive data recovery system 100 for reading data from surface 112 of magnetic disc 110. Data recovery system 100 typically includes MR head 120, preamplifier circuit 130, read filter 140, coupling capacitor 150 and read channel 160. MR head 120 includes an MR transducer carried on a slider which "flies" over surface 112 of disc 11p. Sometimes, the term "MR head" is used to refer to the transducing element only. As used herein, the term can mean the transducing element only, in which case a slider carries the MR head. In the alternative, the term "MR head", as used herein, can mean the transducing element and the slider (i.e., the "head slider").

MR head 120 is typically coupled via electrical connections 122 to preamplifier 130. Preamplifier 130 is typically coupled via electrical connection 132 to read filter 140. Read filter 140 is typically coupled to read channel 160 via electrical connection 142, coupling capacitor 150 and electrical connection 152. The block diagram of FIG. 1 is intended to diagrammatically illustrate the data recovery system of a typical disc drive. However, in must be noted that other circuits and/or components may be included with, or substituted for, those shown in FIG. 1. For example, MR head 120 can be interpreted to include any necessary drive circuitry which may be needed to drive MR head 120 in a manner known in the art. In the alternative, the drive circuitry can be considered to be an integral portion of preamplifier 130. Similarly, other well known disc drive data recovery system circuits or components can be included or substituted for those shown. Further, filter 140 can have a different physical location in system 100 and/or can be combined with other components.

During normal operation of data recovery system 100, MR head 120 flies over surface 112 of disc 110 in order to read magnetically stored data from the disc. In response to the data read from surface 112, MR head 120 provides a read signal at electrical connection 122 which is indicative of the data. Preamplifier 130 amplifies the read signal and provides it to read filter 140 via electrical connection 132. Read filter 140 filters the read signal in accordance with preferred read channel characteristics as is known in the art, and provides a filtered read signal to read channel 160 via electrical connection 142, coupling capacitor 150 and electrical connection 152.

Figure 2:
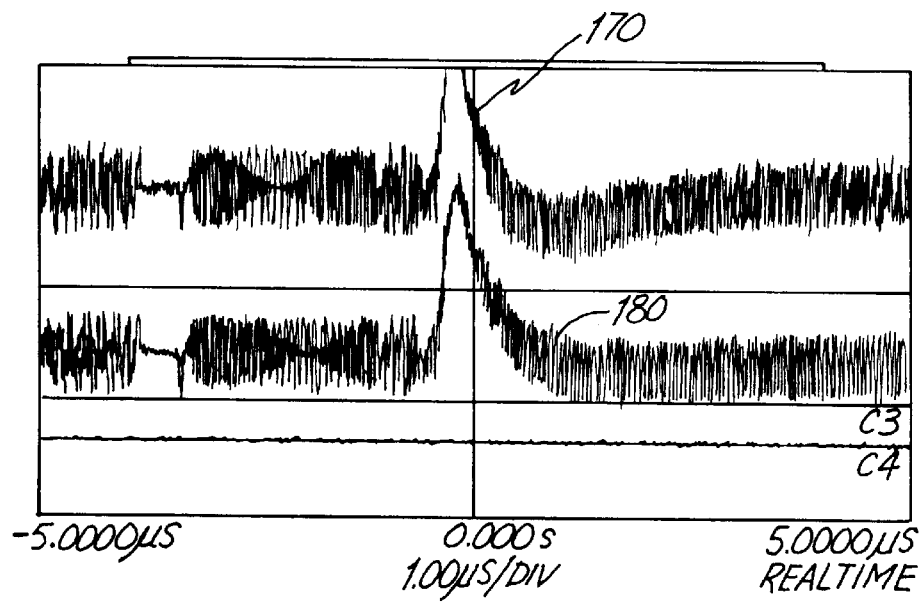
FIG. 2 is a plot illustrating thermal asperity corrupted read signals in a disc drive data recovery system.

Occasionally, MR head 120 comes into physical contact with an asperity 114 on surface 112 as disc 110 rotates below the MR head. The contact causes a thermal asperity which corrupts the read signal. FIG. 2 illustrates the read signal, after amplification by preamplifier 130, during a typical head-thermal asperity interaction. Top signal waveform 170 is from the preamplifier side of coupling capacitor 150 (i.e. from electrical connection 142). Bottom read signal waveform 180 is taken from the read channel side of coupling capacitor 150 (i.e., from electrical connection 152). As can be seen in the waveforms of FIG. 2, the read signal is distorted by a voltage spike and subsequent decay, thus causing the data near the asperity to be unrecoverable. Thermal asperity noise in the read signal generally consists of a sharp rising edge caused by short contact time between the disc surface defect and the MR element of the head, and a slow falling or decaying edge, which is believed to be caused by the slow heat diffusion after contact.

In most cases, the thermal asperity noise lasts for one to two microseconds, representing a data error generally beyond the preferred maximum error correction length of a typical ECC used by the disc drive. In the example cited above, a one-microsecond thermal asperity which occurs on a track written at 128 Mbits per second will corrupt 16 bytes of data. Preferred ECC capabilities are sometimes less than this byte length. Thus, in some prior art data recovery systems like the one illustrated in FIG. 1, the thermal asperity can cause an entire sector of data to be unrecoverable.

Figure 3:
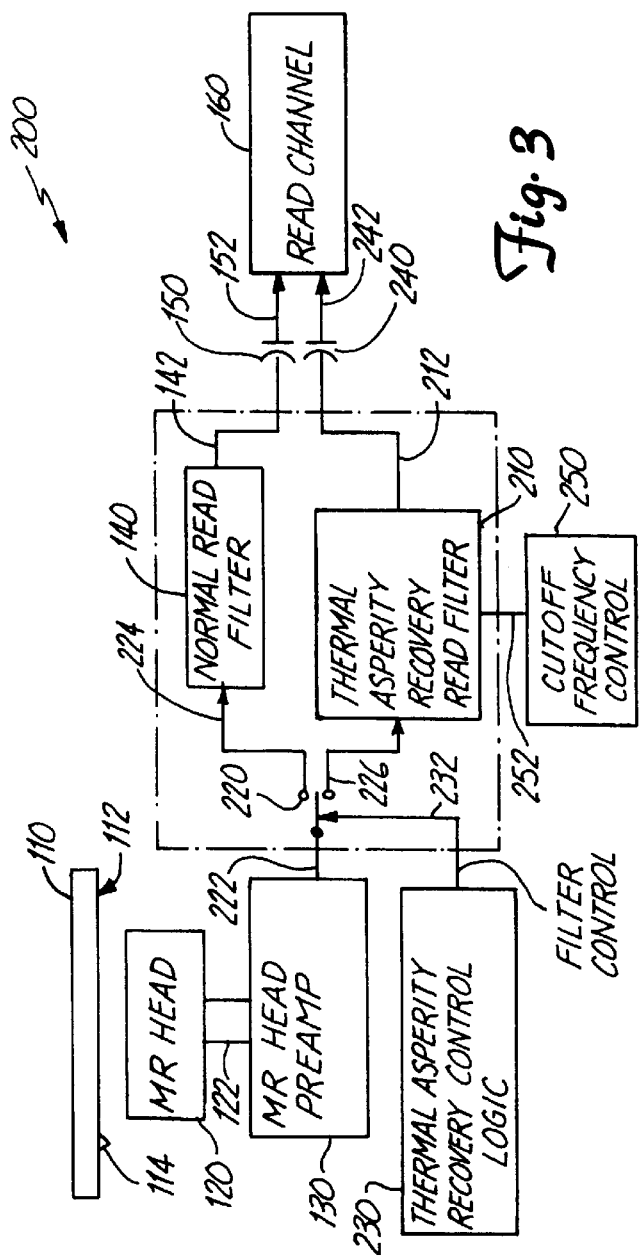
FIG. 3 is a block diagram of a disc drive data recovery system which uses the methods of the present invention to recover data stored over thermal asperities on surfaces of the disc.

FIG. 3 is a block diagram of disc drive data recovery system 200 which uses the methods of the present invention to recover data stored over asperities 114 on surface 112 of disc 110. Like data recovery system 100 illustrated in FIG. 1, data recovery system 200 of the present invention includes MR head 120, preamplifier 130, normal read filter 140, coupling capacitor 150 and read channel 160. In addition, data recovery system 200 includes thermal asperity recovery read filter 210, switch 220, thermal asperity recovery control circuit or logic 230, coupling capacitor 240, and cutoff frequency controller 250. Data recovery system 200 is preferably configured the same as data recovery system 100 with the following exceptions. Instead of preamplifier 130 being permanently coupled to read filter 140, preamplifier 130 is coupled via electrical connection 222 to switch 220. One pole or connection of switch 220 is coupled to the input of read filter 140 via electrical connection 224. Another pole or connection of switch 220 is connected to thermal asperity recovery filter 210 via electrical connection 226. Control circuit 230 is coupled to switch 220 via electrical connection or control line 232. Under the control of control circuit 230, switch 220 selectively couples preamplifier 130 to only one of read filter 140 and thermal asperity recovery filter 210 at a time. Thermal asperity recovery filter 210 is coupled via electrical connection 212, coupling capacitor 240 and electrical connection 242 to read channel 160. Cutoff frequency control circuit 250 is illustrated as being coupled to filter 210 via electrical connection 252. However, control circuit 250 can be any device or configuration of components for selectively adjusting or changing the lower −3 dB cutoff frequency of filter 210.

Because thermal asperity noise has been found to be of a relatively low frequency as compared to the frequency of the read back signal, thermal asperity recovery read filter 210 is preferably a high pass filter having a lower −3 db cutoff frequency selected or optimized such that as much as possible of the read signal corresponding to the data is transmitted or passed by the filter. At the same time, the thermal asperity noise or energy from the read back signal is blocked or attenuated by filter 210 as much as possible.

During thermal asperity recovery mode, thermal asperity recovery filter 210 is switched into the path of the read signal by switch 220, thus providing the desired high-pass filter characteristics needed to reduce the thermal asperity noise or energy. In doing so, the duration of the corrupted portion of the read signal is reduced to within the preferred ECC correction span of the disc drive so that the recorded data can be recovered. Note that, for an embedded servo disc drive, thermal asperity recovery filter 210 should be switched out of the signal path during servo data recovery, since servo data is typically written at a much lower frequency than user data and filter 210 may filter out a servo signal.

Figure 4:
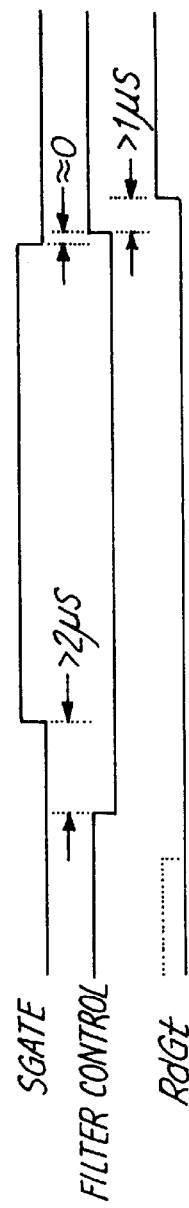
FIG. 4 is a timing diagram which illustrates the operation and control of data recovery system 200 in some preferred embodiments of the present invention.

FIG. 4 illustrates a timing diagram which is useful in understanding the operation and control of data recovery system 200. FIG. 4 depicts the timing requirements for FILTER CONTROL the signal from control circuit 230 which activates switch 220 to route the read back signal through thermal asperity recovery filter 210 during the thermal asperity recovery operations. During normal read and write operations, FILTER CONTROL is held low or inactive, thus causing switch 220 to connect normal read filter 140 to preamplifier 130 and switching on the normal filtering characteristics desired for the read channel. When a sector of data is not successfully recovered after a sequence of normal retry attempts, the thermal asperity recovery mode is enabled. During thermal asperity recovery mode, FILTER CONTROL is preferably asserted (i.e., is changed to an active or high logic level state) after the trailing edge of SGate, a signal which occurs after the servo field has been recovered. Also, FILTER CONTROL is preferably asserted at least one microsecond prior to the assertion (rising edge) of the Read Gate (RdGt) signal, which starts the read operations, to allow sufficient time for the filter circuits to switch to the higher cutoff frequency of the thermal asperity recovery filter. Upon the assertion of the RdGt signal, data recovery system 200 reads the thermal asperity corrupted data from surface 112. With thermal asperity recovery filter 210 coupled to preamplifier 130, as much thermal asperity noise or energy as is possible is removed from the read back signal. FILTER CONTROL is preferably deasserted (falling edge) at least two microseconds prior to assertion (rising edge) of SGate, allowing sufficient time for system 200 to switch back to the lower cut off frequency (i.e., back to normal read filter 140) required by the servo recovery system.

Figure 5:
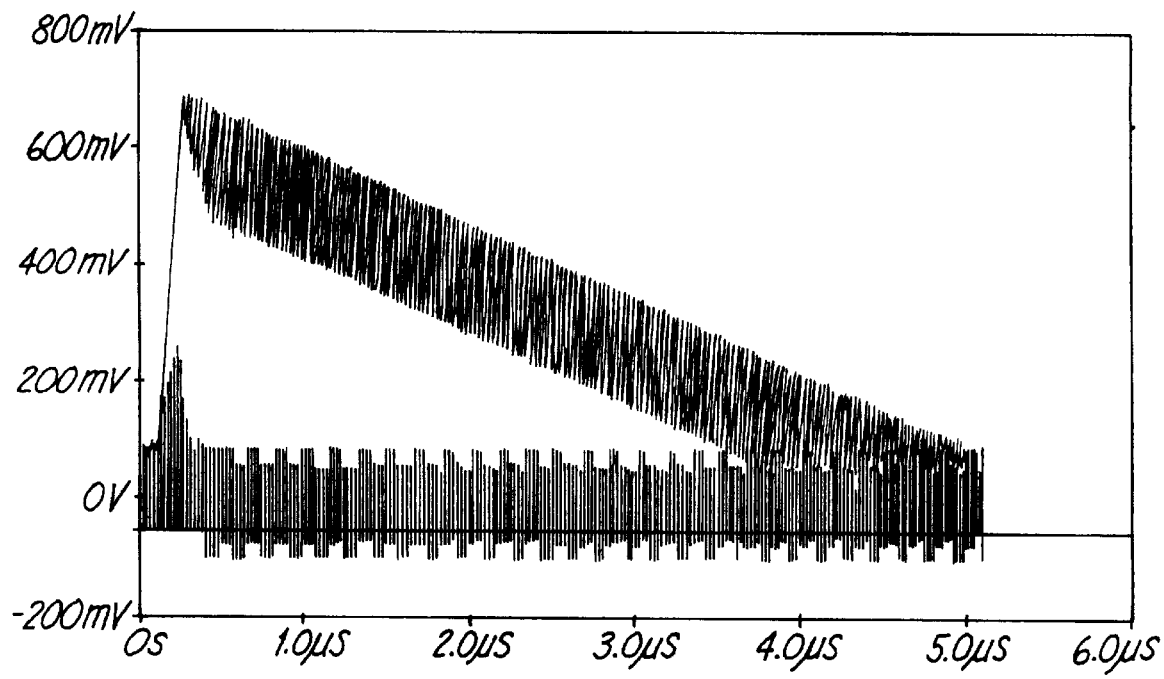
FIG. 5 is a PSpice simulation of a thermal asperity noise signal, both before and after asperity filtering in accordance with the present invention.
Figure 6:
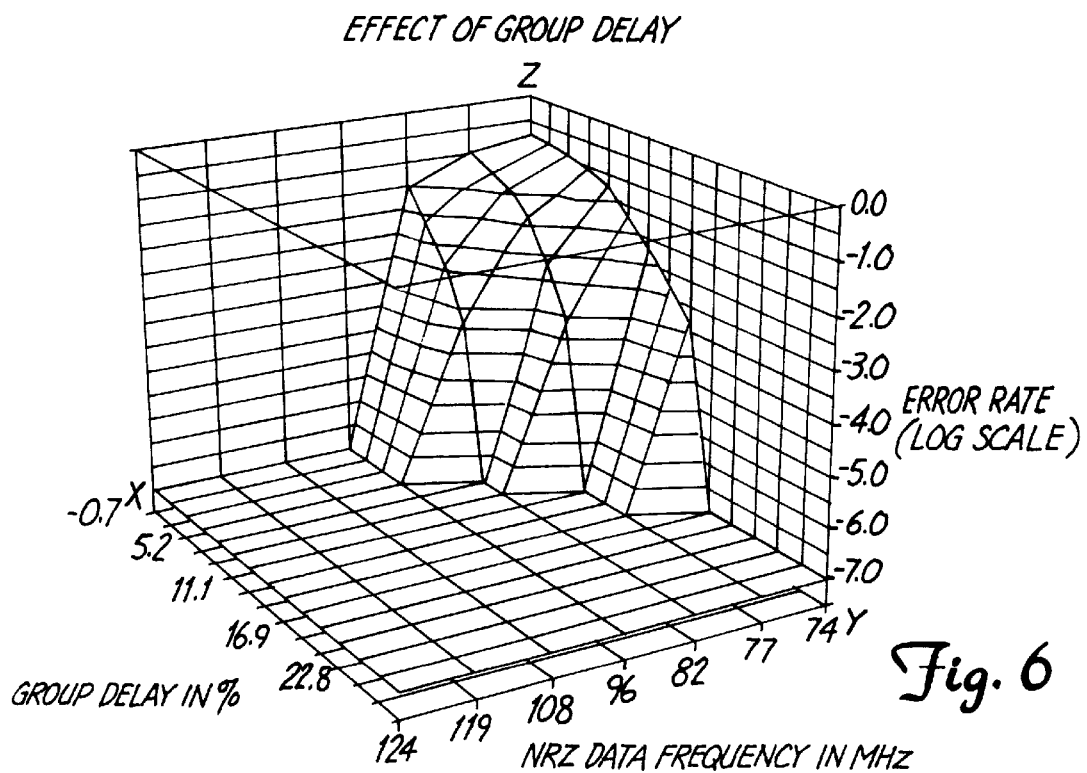
FIG. 6 is a plot which illustrates the effect of group delay filtering properties on the read channel error rate.

FIG. 5 is a PSpice simulation of a thermal asperity noise signal, both before (top waveform) and after (bottom waveform) asperity filtering with a high pass filter like filter 210. The PSpice simulation illustrated in FIG. 5 shows that the majority of the thermal asperity energy is concentrated below 4 Mhz. Therefore, the high pass filter (thermal asperity recovery filter 210) can be switched into the read back signal path during a read retry pass in order to recover the data from the affected sector. By adjusting the lower −3 db frequency of the high pass filter, the duration of the thermal asperity corrupted signal can be reduced to about 300 nanoseconds, or less than 5 bytes at a read rate of 128 Mbits per second, which is within typical ECC correction capabilities. If the lower −3 db cutoff frequency of filter 210 is increased such that it is close to the read back signal frequency, a group delay compensation is required. In disc drives using zoned bit recording (ZBR), this compensation is zone frequency dependent. ZBR is a will known technique for recording data on a disc which uses different writing or reading frequencies in different zones of the disc in an attempt to achieve a desired bits per inch (BPI) profile. Using ZBR, outer radius zones are assigned higher frequencies. In some cases, other channel parameters such as slimming and band width may also be adjusted during the thermal asperity data recovery process. An example of the effect of the group delay filtering properties on the read channel error rate is shown in the plot of FIG. 6. In the plot FIG. 6, the Z-axis represents the error rate, the X-axis represents the recording frequency for various zones, and the Y-axis represents the group delay.

The maximum negative −3 db cutoff frequency to be used during thermal asperity recovery is limited by the minimum data transfer rate. Lower data transfer rates require lower cut off frequencies to avoid significant signal corruption due to the filtering provided by thermal asperity recovery filter 210. However, in some systems, the maximum cut off frequency can be adjusted by control circuit 250 according to the zone data transfer rate on a zone by zone basis. Higher frequency zones can use higher thermal asperity filter lower −3 db cutoff frequencies than can lower frequency zones. This shortens the filtered thermal asperity error and keeps the error length within the ECCs correctable error threshold. Lower frequency zones with lower thermal asperity filtering cutoff frequencies can afford to stretch the filtered thermal asperity error in time, since the number of affected data bits per time increment is lower at the lower data rates. The cut off frequency adjustment can be made in preamplifier 130 or in read channel 160. In general, cutoff frequency control circuit 250 controls the adjustment of the lower −3 dB cutoff frequency of filter 210.

To minimize the channel response to the unfiltered thermal asperity noise, the channel timing and the automatic gain control (AGC) response have to be slowed down or even frozen so that a thermal asperity error is not propagated. AGC is a term used in the art to refer to circuitry which adjusts the amplitude of the read signal to a desired signal level as the input signal level varies. Since the thermal asperity initially causes a large increase in the read signal amplitude, the AGC must be slowed down or frozen to prevent the gain from being turned down during the thermal asperity. Different read channels may have different responses to the thermal asperity noise and may therefore require different channel adjustments in the thermal asperity recovery procedure.

Figure 7:
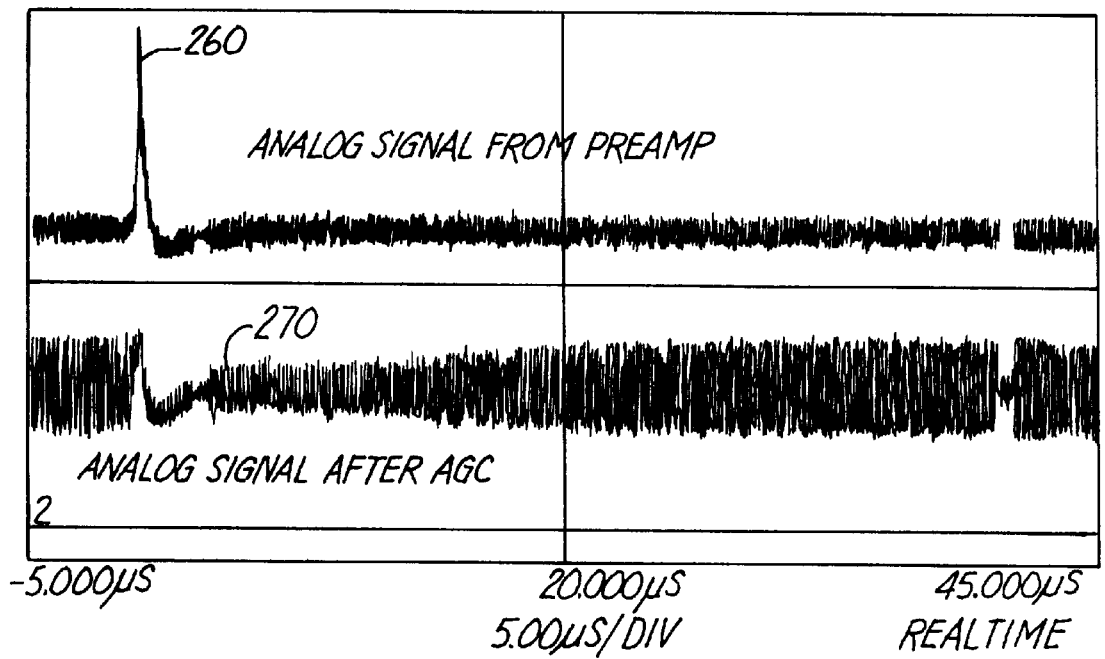
FIGS. 7, 8 and 9 illustrate the responses of automatic gain control (AGC), phase-locked loop (PLL) and finite impulse response (FIR) filter circuitry, respectively, to a typical thermal asperity.
Figure 8:
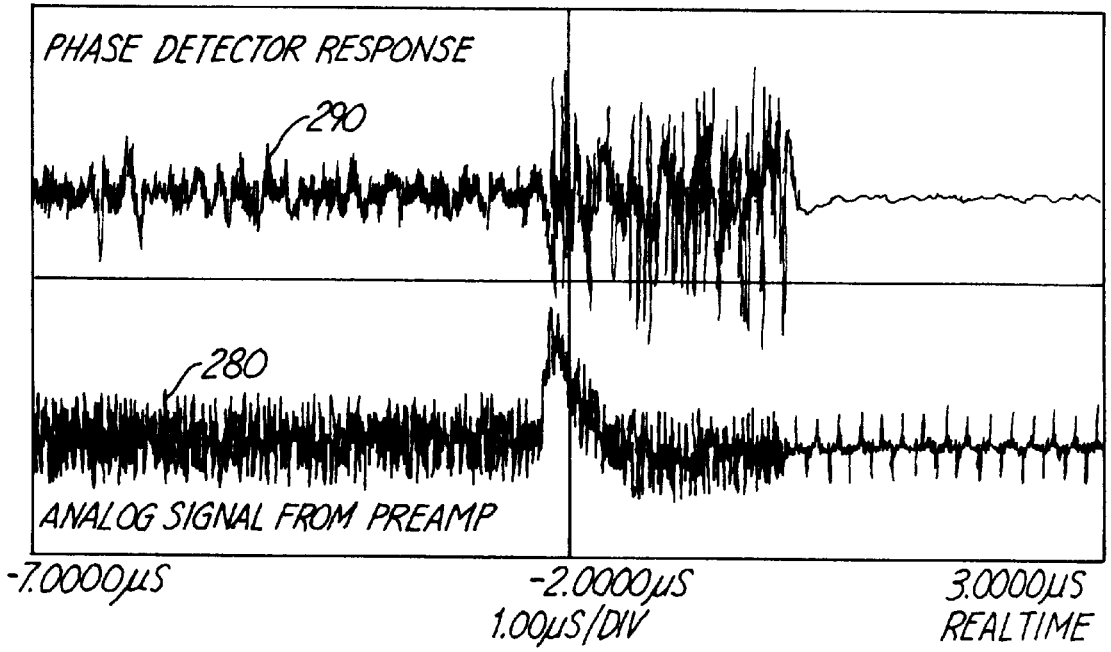
Figure 9:
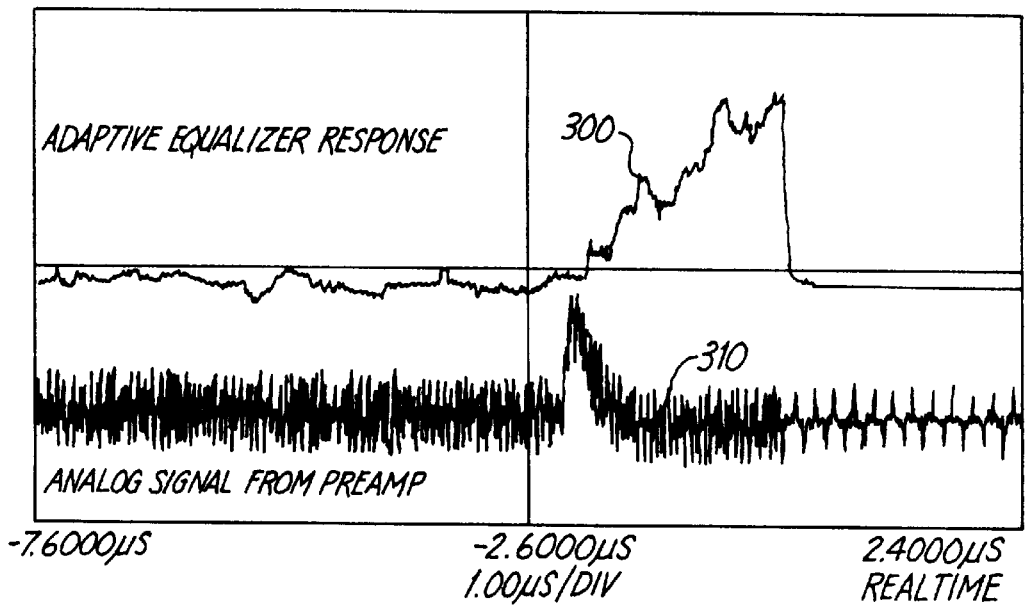

FIGS. 7, 8 and 9 show the responses of the AGC, the phase-locked loop (PLL) and the finite impulse response (FIR) filter, respectively to a typical thermal asperity in one partial response maximum likelihood (PRML) read channel. These are well known components of digital detection or synchronized channels. PLL circuit (not shown) is a well known component of disc drives which extracts a clock signal from the incoming bit stream of data. The FIR filter (not shown) is a well known component of disc drives which provides adaptive zone by zone equalization to attenuate certain signal frequencies while amplifying other frequencies. As illustrated in FIG. 7, the AGC responds to a thermal asperity corrupted signal (waveform 260) by producing AGC'ed signal (waveform 270) having gain loss. It takes over 25 micro-seconds for the AGC to recover from the amplitude loss. As shown in FIG. 8, the PLL response (waveform 290) to a thermal asperity signal (waveform 280) results in a phase error. As shown in FIG. 9, the response (waveform 300) of an adaptive FIR filter to a thermal asperity corrupted signal (waveform 310) results in an equalization error.

Figure 10:
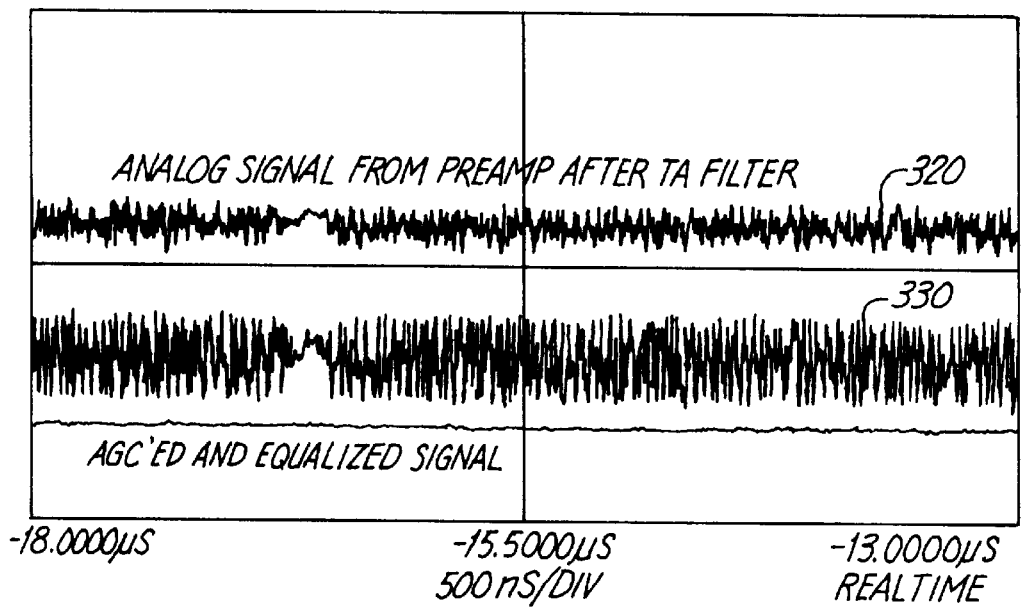
FIG. 10 is a plot illustrating a thermal asperity filtered waveform, both before and after being processed by the AGC circuitry.

The above described errors can be reduced or eliminated by freezing the adaptive parameters of these devices during thermal asperity recovery. FIG. 10 illustrates the filtered analog signal (waveform 320) before being fed into the read channel, along with the signal (waveform 330) after being AGC'ed and equalized. In this case, the channel AGC and equalization are frozen after the PLO field, and the PLL is slowed down to about 1/10th of the normal operation. In this manner, the above described errors can be eliminated.

Generally, not all of the thermal asperity noise can be removed by the high pass filter (i.e., by thermal asperity recovery filter 210) due to the sharp rise time of the thermal asperity noise and to possible saturation caused by the high thermal asperity noise amplitude. The portion of the data signal lost after thermal asperity filtering must be detected and corrected by the drive's ECC. The maximum ECC correction length of the specific disc drive can be used to determine the maximum thermal asperity corrupted signal length allowable or desired after thermal asperity filtering. This desired level of thermal asperity filtering in turn can be used to determine the high pass filter transfer function of the thermal asperity recovery filter. Control circuit 250 can then be used to implement this transfer function.

Figure 11:
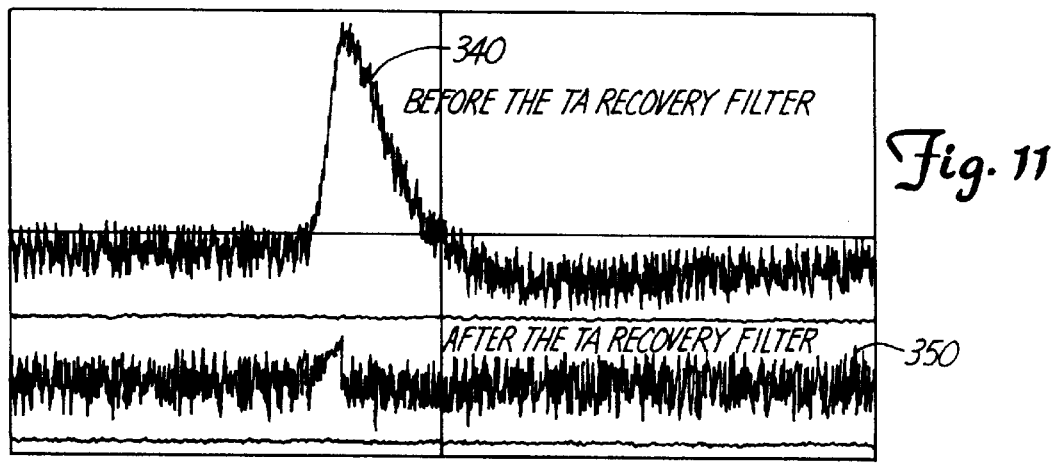
FIG. 11 is a plot illustrating a read data signal corrupted by thermal asperity noise, both before and after thermal asperity recovery filtering in accordance with the present invention.

As discussed, the data recovery system and method of the present invention can been used to recover data recorded over thermal asperities in disc drives. FIG. 11 illustrates the read data signal corrupted by a thermal asperity both before (waveform 340) and after (waveform 350) thermal asperity recovery filtering in accordance with the present invention. The data recording rate used in the plot of FIG. 11 is 123 Mbits per second. As can be seen in FIG. 11, the data recovery system and method of the present invention greatly reduces the thermal asperity noise or energy from the read back signal, to a point at which the data can be recovered using the disc drive's ECC.

Although the present invention has been described with reference to preferred embodiments, workers skilled in the art will recognize that changes may be made in form and detail without departing from the spirit and scope of the invention. For example, the thermal asperity filter of the present invention can be located elsewhere in the data stream of data recovery system 200, or even combined with other components such as the preamplifier or read channel. Further, while the timing diagram of FIG. 4 illustrates one method of controlling thermal asperity filter 210, numerous other methods are possible.

What is claimed is:

1. A disc drive data recovery system for recovering data from a magnetic disc having asperities thereon, comprising:

a magnetoresistive head for reading magnetically encoded data from the magnetic disc and providing in response a signal indicative of the magnetically encoded data, wherein contact between the magnetoresistive head and an asperity corrupts the signal such that the signal contains thermal asperity noise;

a thermal asperity recovery filter selectively coupleable to the magnetoresistive head for receiving the signal from the magnetoresistive head and reducing the thermal asperity noise in the signal, the thermal asperity recovery filter providing as an output a thermal asperity filtered signal;

a read signal filter selectively coupleable to the magnetoresistive head for receiving the signal from the magnetoresistive head and providing as an output a filtered signal; and a control circuit for controlling which of the read signal filter and the thermal asperity recovery filter is coupled to the magnetoresistive head, wherein the control circuit causes the thermal asperity recovery filter to be coupled to the magnetoresistive head only when during a thermal asperity recovery mode of the disc drive data recovery system.

2. The disc drive data recovery system of claim 1, and further comprising a preamplifier coupled between the magnetoresistive head and the thermal asperity recovery filter, wherein the preamplifier receives the signal from the magnetoresistive head and amplifies the signal prior to providing the signal to the thermal asperity recovery filter.

3. The disc drive data recovery system of claim 1, wherein the thermal asperity recovery filter is a high pass filter.

4. The disc drive data recovery system of claim 3, wherein the high pass filter has a cutoff frequency.

5. The disc drive data recovery system of claim 4, wherein the cutoff frequency is selected based upon a minimum data transfer rate of the disc drive data recovery system.

6. The disc drive data recovery system of claim 5, and further comprising means for adjusting the cutoff frequency of the high pass filter.

7. A disc drive data recovery system for recovering data from a magnetic disc having asperities thereon, comprising:

a magnetoresistive head for reading magnetically stored data from the magnetic disc and providing in response an MR head output signal indicative of the magnetically encoded data, wherein contact between the magnetoresistive head and an asperity corrupts portions of the MR head output signal such that the MR head output signal contains thermal asperity noise energy;

a preamplifier coupled to the magnetoresistive head for receiving the MR head output signal and providing in response a preamplifier output signal indicative of the magnetically encoded data, wherein corrupted portions of the MR head output signal result in corrupted portions of the preamplifier output signal such that the preamplifier output signal contains thermal asperity noise energy;

a read channel;

a read channel filter coupleable between the preamplifier and the read channel for selectively coupling the read channel to the preamplifier and filtering the preamplifier output signal during normal read operation of the disc drive data recovery system;

a thermal asperity recovery filter coupleable between the preamplifier and the read channel for selectively coupling the read channel to the preamplifier and filtering the preamplifier output signal during thermal asperity recovery operation of the disc drive data recovery system to reduce the thermal asperity noise energy contained in the MR head output signal; and means for controlling which of the read channel filter and the thermal asperity recovery filter are coupled between the preamplifier and the read channel, wherein the means for controlling causes the read channel filter to couple the read channel to the preamplifier during normal read operation of the disc drive data recovery system, and wherein the means for controlling causes the thermal asperity recovery filter to couple the read channel to the preamplifier during thermal asperity recovery operation of the disc drive data recovery system.

8. The disc drive data recovery system of claim 7, and further comprising a switch coupled to the preamplifier, to the read channel filter and to the thermal asperity recovery filter, wherein the means for controlling controls the switch such that the switch couples the read channel filter to the preamplifier during normal read operation of the disc drive data recovery system, and wherein the means for controlling controls the switch such that the switch couples the thermal asperity recovery filter to the preamplifier during thermal asperity recovery operation of the disc drive data recovery system.

9. The disc drive data recovery system of claim 8, wherein the means for controlling controls the switch such that the switch couples the thermal asperity recovery filter to the preamplifier only after the disc drive data recovery system has completed a servo field recovery operation.

10. The disc drive data recovery system of claim 7, wherein the thermal asperity recovery filter is a high pass filter.

11. The disc drive data recovery system of claim 10, wherein the high pass filter has a cutoff frequency.

12. The disc drive data recovery system of claim 11, wherein the cutoff frequency is selected based upon a minimum data transfer rate of the disc drive data recovery system.

13. The disc drive data recovery system of claim 12, and further comprising means for adjusting the cutoff frequency of the high pass filter to accommodate different zone data transfer rates.

* * * * *